United States Patent
Siebol et al.

[15] 3,680,202
[45] Aug. 1, 1972

[54] THE METHOD OF SETTING A LOCKBOLT
[72] Inventors: George Siebol, Orange; Dorian E. Rippy, Fullerton, both of Calif.
[73] Assignee: Olympic Screw & Rivet Corporation, Downey, Calif.
[22] Filed: Nov. 14, 1969
[21] Appl. No.: 876,647

[52] U.S. Cl. ............................................... 29/520
[51] Int. Cl. ........................... B21d 39/00, B23p 11/00
[58] Field of Search .... 29/520, 515, 505; 72/46; 85/7

[56] References Cited
UNITED STATES PATENTS 3,276,499  10/1966  Reusser ........................ 29/520
3,286,338  11/1966  Bohr ............................. 29/520
3,467,414  9/1969   Downing ....................... 29/520

Primary Examiner—John F. Campbell
Assistant Examiner—Donald R. Rooney
Attorney—Hyman Jackson

[57] ABSTRACT

A hydro-pneumatic hand tool that is trigger-controlled to fasten a collar over the end of a headed lockbolt provided with locking grooves and a severable pintail, and then to create a predetermined clamping and swaging force on said lockbolt and collar by the use of a two-piston system, with each piston having an independent power source.

6 Claims, 10 Drawing Figures

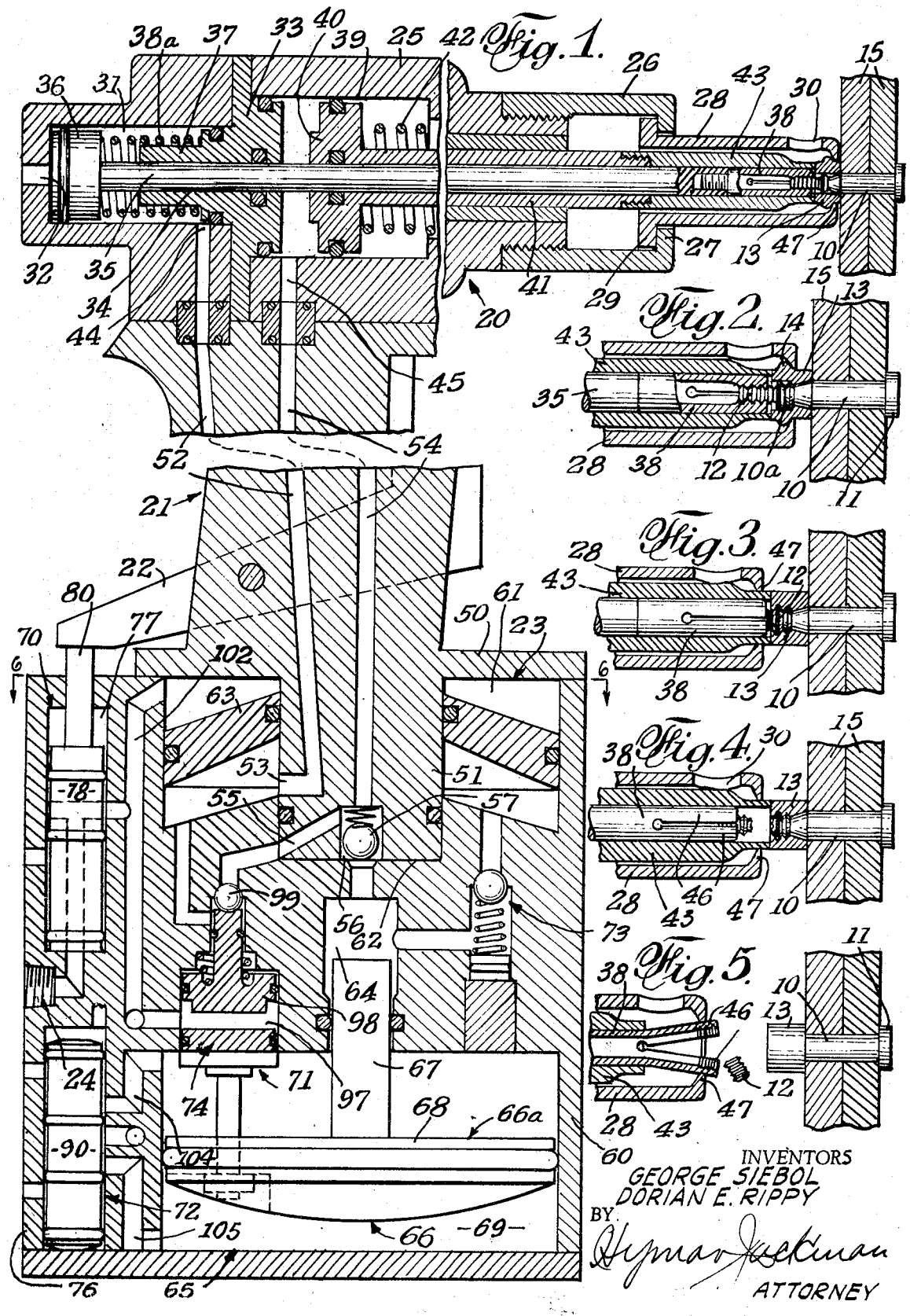

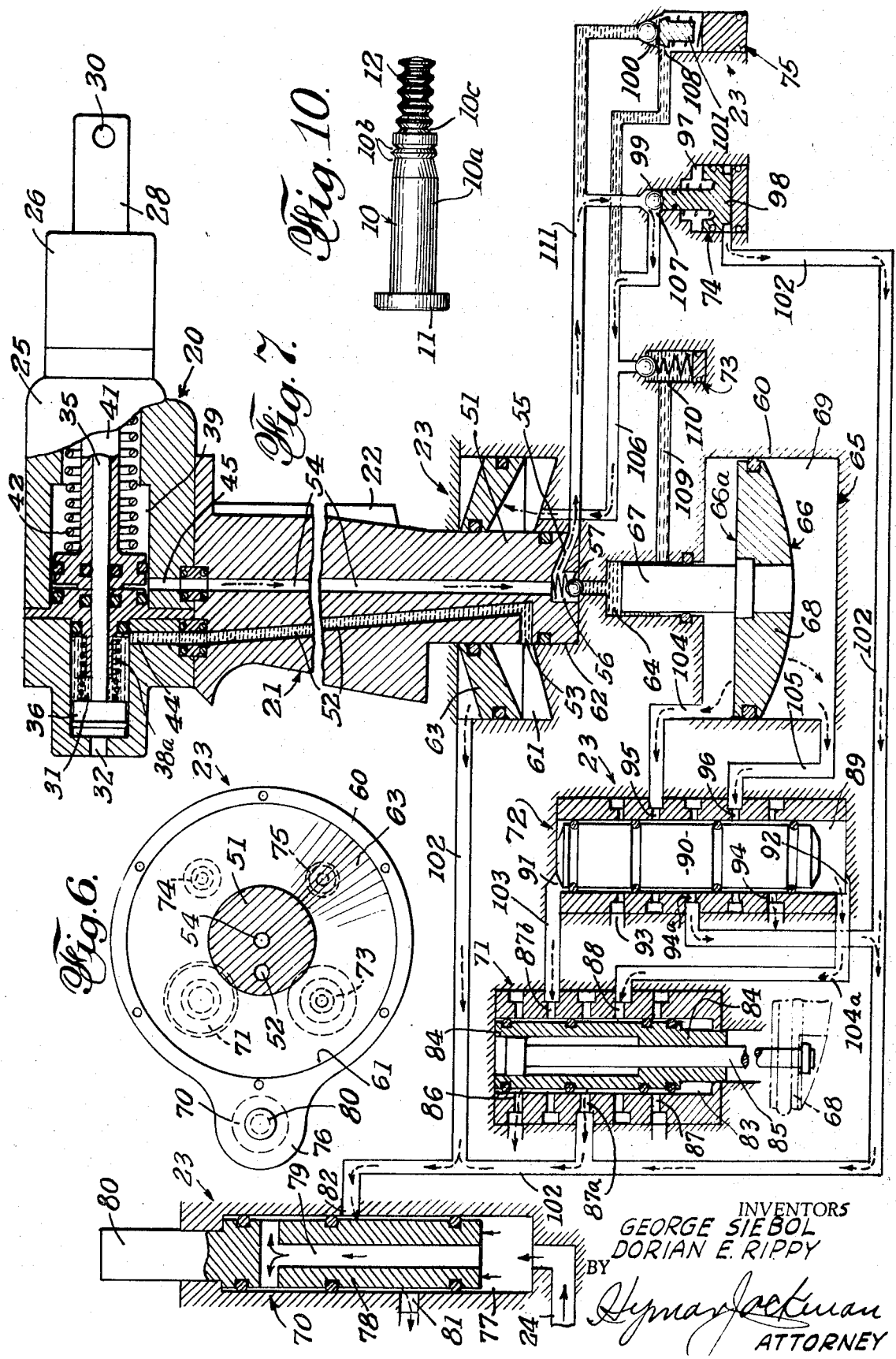

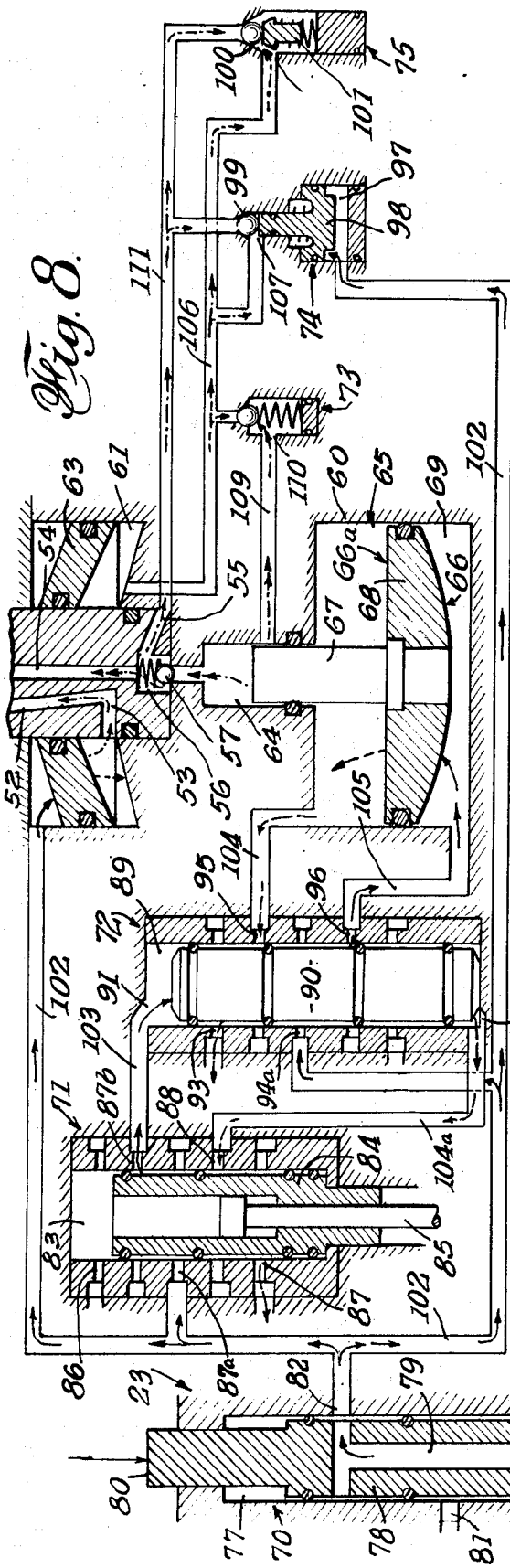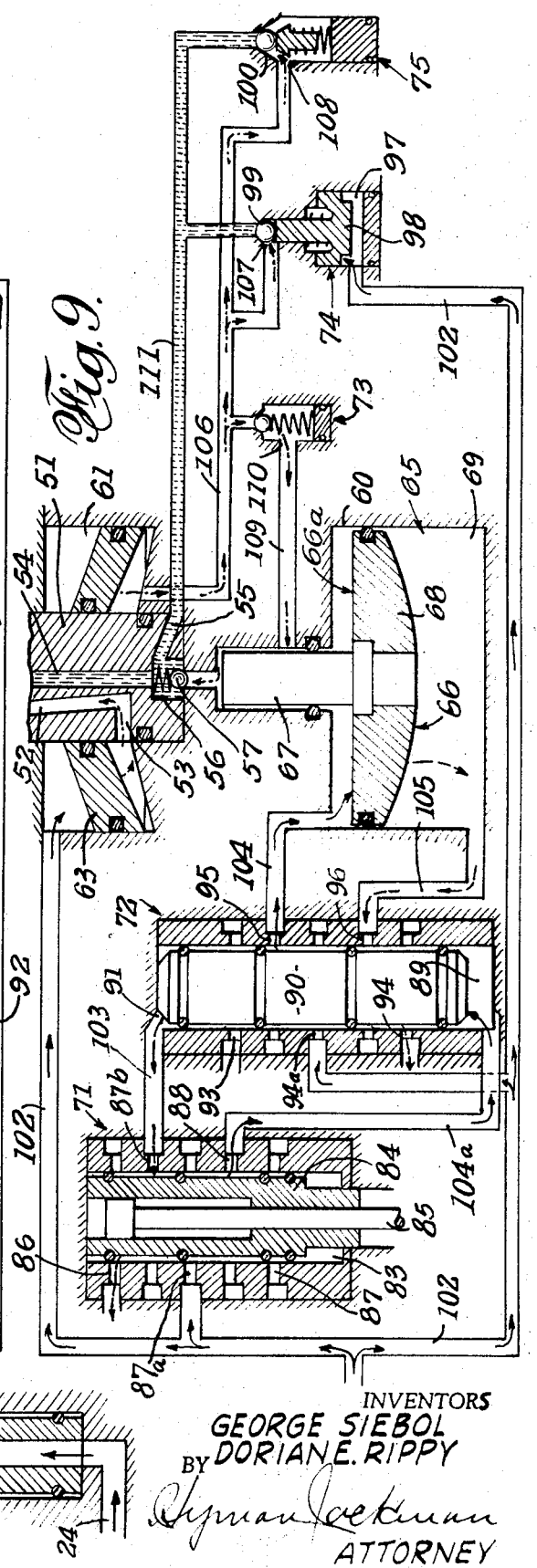

THE METHOD OF SETTING A LOCKBOLT

BACKGROUND OF THE INVENTION

1. Field of the Invention

Fastening together plates or other members in flatwise engagement. The present invention deals with improvements of the U.S. Pat. Nos. 3,091,982 and 3,241,421, to Siebol.

Prior Art

The applicants have no knowledge of any comparable tools for similar or related purposes that utilize reacting forces supplied by the tool itself to effect a predetermined clamp-up load immediately prior to and during swaging of a collar to a lockbolt. A known competitive tool utilizes the reactive force of the severable pintail breakneck load to swage the locking collar onto the lockbolt. However, when the reactive force of the severable pintail breakneck load is used to swage certain metals requiring an inordinately high swaging force, too high a tensile load is placed on the lockbolt locking grooves and this may cause failure of the operation.

SUMMARY OF THE INVENTION

A hydro-pneumatic gun having a large piston for the swaging of a malleable collar into annular grooves of a headed lockbolt and a small piston to provide a predetermined preload and sever the pintail when drawn to a pre-set stop, the pistons having independent power sources. The large piston's hydraulic source is a pneumatic hydraulic intensifier. The source of power for the small piston is pneumatic pressure which is exerted on an hydraulic oil reservoir. Both power sources are controlled by pneumatic hand-operated means.

The hydro-pneumatic gun here disclosed, which utilizes an independent lockbolt collar swaging force with an hydraulic piston, and supplies a clamping force to the severable pintail with an independent smaller piston, may be utilized to meet the required higher lockbolt collar swaging forces of various materials and predetermine the clamping force to the severable pintail. This clamping force may be pre-set to any desired load. This tool's range may include plastics as well.

BRIEF DESCRIPTION OF THE DRAWINGS

In the drawings, like reference characters designate similar parts in the several views.

FIG. 1. is a broken vertical sectional view of a lockbolt setting tool according to the present invention, shown in the position of the parts thereof during the first operation step.

FIGS. 2, 3, 4 and 5 are fragmentary sectional views showing the successive positions of the tool parts that act on the lockbolt during the second through the final operation steps.

FIG. 6 is a cross-sectional view, to a reduced scale, as taken on the line 6—6 of FIG. 1.

FIG. 7 is a semi-schematic view of the tool showing the hydro-pneumatic operative components in diagrammatic arrangement in the "off" or "at rest" position thereof.

FIGS. 8 and 9 are similar semi-schematic views, with the gun portion of the tool omitted, respectively showing the power stroke positions of the components and the positions of the components at hydraulic intake.

FIG. 10 is a side elevational view of a lockbolt as used in the present invention.

DESCRIPTION OF THE PREFERRED EMBODIMENT

The procedure for installation of the fastener is as follows. The fastener 10 is placed through a hole in the sheets 15 to be fastened. The locking collar 13 is placed within the swaging tool 28. The swaging tool is then placed over the severable pintail 12 and onto the locking grooves thereof. When the trigger of said tool is actuated, the large piston 40 thereof places the collar 13 into position and closes the gripping jaws 46 over the severable pintail. By the forward movement of the large piston, the tool is forced away from the sheet. The movement away from the sheet automatically applies a predetermined clamping force based upon the force applied against the small piston 36. As the swaging tool is completing the final swaging of the locking collar 13 into the locking grooves, the small piston 36 is pulled to a pre-set stop, thereby severing the pintail and leaving the fastener permanently set with a predetermined residual clamping load within the joint that has been fastened.

The present tool is devised to install a lockbolt fastener in sheet- or plate-connecting engagement. Said fastener comprises a lockbolt 10 (FIG. 10) having a head 11 on one end, a shank-gripping portion 10a, annular locking grooves 10b in said end, a pre-set weakened breakneck 10c, and a grippable, severable pintail 12 of reduced size extending from the breakneck 10c, and a malleable collar 13 having an outer circumferential enlargement 14. Said fastener is shown in the successive steps of its installation connecting plates 15 of FIGS. 1 to 5, inclusive, wherein the lockbolt 10 is entered from one side of said plates into aligned holes in said plates so the head 11 thereof is on one side of the plates, and the locking grooves 10b, breakneck 10c and the pintail 12 thereof, extend through and beyond the opposite side, and the lockbolt collar 13 is slid over the pintail and onto the grooved portion of the shank as in FIG. 1.

The present tool comprises, generally, a gun portion 20 mounted on a hand grip 21 provided with an operation-instituting trigger 22, and a gun-controlling power component 23 depending from the hand grip, said component 23 being provided with a pressure air inlet 24.

The gun 20 is shown as comprising a body 25 having a forwardly directed portion 26 with an inner flange 27 on the end thereof, and a tubular swaging anvil 28 with an extension-limiting flange 29, engageable by said flange 27, having an opening 30 through which a collar is adapted to be inserted into the hollow of the anvil 28 preparatory to application of said collar to the grooved portion 10b of a lockbolt.

Said body 25, at its rearward end, is provided with a cylinder 31 having a vent 32 at one end, and a transverse partition 33 closing the other end of said cylinder, said partition having an axial bore 34 for the stem 35 of a small piston 36 fitted in said cylinder 31. The partition is provided with a rearward projection 37 constituting a pre-set stop to limit the forward position of the piston and of the gripping jaws 46 on said stem 35. A spring 38a between the small piston 36 and the partition 33 provides a light rearward bias on said piston.

A second cylinder 39 is provided in said gun body, forwardly of the partition 33, a second piston 40, larger than the piston 36, being fitted in said cylinder and having a hollow stem 41 through which the stem 35 extends forwardly. Said larger piston is biased rearwardly toward the partition 33 by a spring 42. A hollow, forward extension 43 on the hollow stem 41 serves to close the jaws 38 into gripping engagement with the pintail 12. Further forward movement positions the collar 13 into engagement with the plates 15 during the collar-swaging operation of the tool by the member 28.

A port 44 for hydraulic fluid extends radially through the gun body and opens into the cylinder 31 in the area thereof between the partition 33 and the piston 36, the pressure of said fluid biasing this piston rearwardly. Hereinafter, said piston 36, the stem 35, and the jaws 38 on the latter, will be called the "back piston," since its active movement, when pulling on a pintail, is backward. A second port 45 for high-pressure hydraulic fluid extends radially through the gun body and opens into the area of the cylinder 39 between the partition 33 and the piston 40. The force of said fluid, under high pressure, biases the piston 40 forwardly. Hereinafter, said piston 40, its stem 41, and extension 43 on the latter, will be called the "high-pressure piston," its active movement, when pressing against a collar 13, being forward. The member 43 is termed the "inner anvil."

It will be noted from FIG. 5 that, at the end of a cycle of operation, the jaws 38 are normally biased apart, so release of the removed portion of the pintail is automatic upon such spreading of the jaws. Said jaws are closed over the pintail by the inner anvil 43 which positions the collar 13 against the plates being fastened and then forces the collar out of the swaging member 28, thereby removing the pintail after complete swaging of the collar.

It will be realized from a comparison of FIG. 1 on the one hand, and FIGS. 2 and 3 on the other, that because the high-pressure piston 40 has a stationary position when bearing against the collar 13, the resultant pressure on the partition 33 will cause the gun 20 to back away from the plates 15, so that the inreaching swaging flange 47 on the swaging anvil 28 will cause the annular enlargement 14 of the collar to become flattened and, in the process, force the metal of the collar into the grooves 10b, locking together the bolt 10 and the collar 13, as in FIGS. 3 and 4.

The hand grip 21 is secured to and extends downwardly from he gun body 25 and, in this case, is provided with a flange 50 at its lower end and with a preferably cylindrical extension 51. The above-mentioned port 44 in the gun body communicates with a generally vertical passage 52 in the grip 21, the same having a laterally directed outlet 53. The port 45 in said body communicates with a vertical passage 54 in the grip, the same terminating in a lateral outlet 55, as well as in a downward outlet 56 controlled by an upwardly opening check valve 57.

After the lockbolt pin 10 is inserted, as above indicated, from one side of the workpiece 15 and the collar 13 is placed into the swaging anvil 28, the gripping jaws 38 are in overlapped relation with the grippable pintail 12. It is then that the trigger is depressed to cause the inner anvil 43 to move forward and closed said jaws 38 over the pintail 12 and to forwardly position the collar against the sheets being fastened, creating a pre-load between collar 13 and small piston 36. The continued forward movement of the anvil 43 forces the collar 13 out of the swaging tool 28 which swages the collar 13 onto the locking grooves 10b of the lockbolt pin 10, with the breakneck and pintail extending therefrom. Upon completing the collar's swaging, the piston 36 is drawn to a pre-set stop, severing the pintail.

It will be clear that said collar 13 is retained in contact with the side of the plates 15 from which the pintail 12 extends by the large piston 40 which forces the collar forwardly out of the swaging tool against said plates, thereby also forcing the entire tool away from the plates being fastened. This creates a reacted force against the small piston 36 to establish a predetermined clamping force. The collar 13 is swaged into a locked engagement with the grooved portion 10a that is adjacent to the plates 15, leaving the pintail 12 extending from the collar, as in FIGS. 2 and 3. Said pintail 12 is removed by the small piston 36 reaching a pre-set stop as in FIG. 4, completing the installation of the lockbolt with a pre-set residual clamping force remaining in tight joining engagement with the plates 15. The present tool carries out the above generally described installation in four successive operational steps, initiated by a pull on the trigger of the gun. A fifth operational step releases the removed portion of the pintail, readying the tool for installation of another fastener.

The power component 23 of the tool, as controlled by the trigger 22, carries out the five operational steps and is housed in a body 60 that is secured to the flange 50 of the hand grip and, as shown, depends therefrom. Said component 23 is shown in three operative positions: in FIG. 7, the position of rest; in FIG. 8, the power stroke position; and in FIG. 9, the hydraulic intake position.

On a common vertical axis, the power unit 23 comprises an hydraulic reservoir 61 through the center of which said extension 51 extends into a bore 60, a sliding piston 63 being fitted on said extension and operative in the reservoir 61; an hydraulic build-up chamber 64 below the lower end of the extension 51, a check valve 57 controlling hydraulic flow between said build-up chamber 64 and the passage 54; and an air intensifier comprising a high-power hydraulic piston 67 operative in the chamber 64 and a lower attached pneumatic piston 68 with a bottom surface 66 and a top surface 66a operative in a cylinder 65.

Said power component 23 further comprises an air-flow-controlling trigger valve 70 operable by the trigger 22, to open pressure air to supply such air to the component 23 during the power stroke and hydraulic intake positions thereof; a mechanical timing valve 71; an air-pressure-reversing valve 72; an hydraulic check valve 73; an hydraulic drain valve 74; and an hydraulic safety valve 75. From FIG. 6, it will be noted that the valves 71, 73, 74 and 75 are arranged around the extension 51 in the body 60 and that the trigger valve 70 and the reversing valve 72 are provided in an offset portion 76 of the body 60, the latter below the former.

The trigger-controlled air valve 70 comprises a cylinder 77, and a flow-controlling spool 78 operable in said cylinder and having an air passage 79 and provided with a trigger-engageable upper end 80. The air inlet 24 is open to the lower end of the cylinder, which is provided with a vent port 81 and a vent-pressure port 82.

The mechanical timing valve 71 comprises a cylinder 83 and a flow-controlling spool 84 operable in said cylinder which is slidingly fitted with a headed stem 85 that is connected to intensifier piston 68; said valve is provided with air-exhausting vents 86 and 87, and vent-pressure ports 87a, 87b and 88.

The air-pressure-reversing valve 72 comprises a cylinder 89 and a flow-controlling poppet 90 operable in said cylinder. Said valve is provided with upper and lower vent-pressure ports 91 and 92 for controlling the position of the poppet 90 in the cylinder 89; exhaust ports 93 and 94; and vent-pressure ports 94a, 95 and 96.

The hydraulic check valve 73 is shown as a conventional ball check; the hydraulic drain valve 74 is shown as having a cylinder 97 fitted with a spring-biased piston 98 with a reduced end controlling a ball check 99; and the hydraulic safety valve 75 is shown as a ball check 100 that is biased against pressure by a spring-loaded follower 101.

An air flow line 102 interconnects the vent-pressure port 82 of the trigger-controlled valve 70 with the reservoir 61, with vent-pressure port 87a of valve 71, with the vent-pressure port 94a of valve 72, and with the cylinder 97 of the hydraulic drain valve 74, below the piston 98 thereof.

A flow line 103 connects the port 87b of valve 71 with the port 91, and a flow line 104a connects the ports 88 and 92 to said respective valves.

A flow line 104 connects the port 95 of valve 72 with the upper portion of the chamber 69, and a flow line 105 connects the port 96 of said valve with the lower portion of said chamber.

A flow line 106 connects the lower portion of the reservoir 61 with the inlet side of hydraulic check valve 73, with a port 107 to the ball check 99, and with a port 108 to the ball check 100. A flow line 109 connects the build-up chamber 64 with a port 110 to the check valve 73.

A line 111 connects the lower end of the passage 54 with the line 106 through the hydraulic drain valve 74 and the hydraulic safety valve 75.

For lack of space, the valve 70 has been omitted from FIG. 9. This valve, in the position thereof as in FIG. 8, should be considered as being connected to line 102. Also, it will be seen from FIG. 1 that the stem 85 is connected to and moves with surface 66a of the differential piston 68. This connection should be assumed for said stem in FIGS. 7, 8 and 9.

OPERATION: Preliminary

As explained above, the lockbolt pin 10 is inserted into the mentioned aligned holes in the plates or workpiece 15 in the position of FIG. 1, with the head 11 of said pin on one side and the locking grooves 10b, breakneck 10c, and the grippable pintail 12 on the other. The collar 13 is inserted into the opening 30 of the tubular portion of swaging member 28, the member 43 being withdrawn slightly more than in FIG. 5 and the jaws 38 similarly withdrawn. With the collar 13 retained in position by the swaging flange 47, the spread jaws 38 may be moved into position over the pintail 12. Depressing the trigger 22 causes the inner anvil 43 to move forwardly, closing the jaws 38 over the grooves of the pintail 12 and moving the collar 13 into swaging position against the workpiece, as in FIG. 1. This movement causes a reactive force to be applied by the piston 36 which, in turn, causes the pre-load between the sheets being fastened. By moving the collar to this position, a pre-set pull is exerted on the pintail 12 which is maintained during the swaging operation by piston 36. The swaging operation is accomplished by the forward movement of the inner anvil 43 which forces the collar out of the swaging anvil 28 and into the locking grooves 10b. The pre-load is maintained by piston 36 moving forward against a set hydraulic pressure until it reaches stop 37 where forward travel is stopped. This, in turn, causes the pintail 12 to be parted from lockbolt 10. As the inner anvil continues forward movement relative to the end of the swaging anvil 28, the gun is bodily forced away from the workpiece 15, causing the swaging member 28 to be drawn in a backward direction over the collar 13. The resultant radial compression around the entire circumference of the enlargement 14 of said collar 13 forces the metal of the collar into locking engagement in the grooves of the shank. The lock is permanent, with a set pre-load, in tension, on the lockbolt pin 10.

OPERATION: Position of Rest of the Tool

Referring particularly to FIG. 7, with reference as required to FIGS. 1 through 5, the solid arrows represent air pressure that is effective to raise the spool 78 of the air trigger valve 70 to its raised position shutting off air flow to the other components of the tool. The dotted arrows represent venting or return air flow for the various components of the tool, and the horizontal dotted lines in certain of the passages, in the hydraulic build-up chamber 64, and below the ball of the check valve 73, are representative of hydraulic fluid under no holding pressure.

Following the broken arrows, it will be seen that the reservoir 61, above the piston 63, is directly vented through line 102, through the valve 70, to exhaust port 81 of said valve; that the chamber 69, above the piston 68, is vented through the pressure-reversing valve 72 through exhaust port 93, or to line 102, and thence to exhaust port 81, depending on the position of pressure-reversing valve 72 when trigger valve 70 is released; that said chamber 69, below said piston 68, is vented through the line 105 and the valve 72, through the vent port 94 of said valve, or to line 102, and thence to exhaust port 81, depending upon the position of pressure-reversing valve 72; that the upper end of valve 72 is vented through line 103 and the mechanical timing valve 71, through exhaust port 86, or to vent port 87a in the mechanical timing valve 71, to exhaust port 81 through line 102, depending upon the position of flow-controlling spool 84; that the lower end of valve 72 is vented through line 104a and valve 71 to the exhaust port 81 through line 102, or through valve 71 to exhaust port 87, depending upon the position of spool 84; and that the cylinder 97, below the piston 98 of the hydraulic drain valve 74, exhausts through port 81 by way of line 102, allowing the spring bias on said piston to open the ball check 99.

OPERATION: Power Stroke

Upon depression of the spool 78 of valve 70 by pressure on the trigger 22, and while the pressure on the trigger is maintained as shown in FIG. 8, the power stroke position of the tool components begins. In this position, pressure air from inlet 24, through passage 79 in the spool, provides a flow of air to the line 102 (as shown by the solid arrows), which applies pressure on the sliding reservoir piston 63 which, in turn, supplies an hydraulic force onto piston 36 through passage 52, while simultaneously applying pressure to the top of the poppet 90 of the air-reversing valve 72 to move the same to the low position of FIG. 8, thereby causing application of air pressure in the lower portion of chamber 69 and upwardly on the air intensifier piston 68, and applying pressure in cylinder 97 of the hydraulic drain valve 74 to raise the piston 98 thereof, closing the check valve 99. To allow the poppet 90 to be depressed, the bottom of valve 72 exhausts through line 104a and exhaust port 87 of the mechanical timing valve; and to allow the air intensifier piston 68 to move upwardly, as indicated, the upper portion of chamber 69 vents through line 104 and the exhaust port 93 of the pressure-reversing valve 72.

Since the exhaust port 81 is closed in the trigger-actuated position of the valve 70, as in FIG. 8, the valve 72, below the poppet 90, is vented through exhaust port 87, as above described. The downward movement of the air piston part 68 affects a downward shift of the spool 84, by means of the head on stem 85, and air piston 68 acts on the bottom of the spool to return it to a raised position, as in FIGS. 7 and 9.

The air pressure on the surface 66 of the piston 68 produces an increased hydraulic force in the build-up chamber 64, by piston 67. This hydraulic force is shown as double-headed dot-dash line arrows. The same is effective, through line 109, to hold the check valve 73 closed against any pressure thereon from the reservoir 61. This high pressure is effective in passage 54 and against the larger piston 40 in the gun 20 to cause the member 43 to press the collar 13. The build-up of pressure between the partition 33 and said piston 40 creates a reaction therebetween that causes the gun to be forced away from the workpiece 15, thereby creating a reactive force on back piston 36, pulling it forward simultaneously under a low hydraulic load, causing a predetermined clamping force to the position of FIG. 2, then of FIG. 3, whereby the swaging flange 47 of said member 43 forces the metal of the collar into the locking grooves 10b of the bolt 10 immediately adjacent to the pintail 12, and firmly locking the lockbolt collar to the lockbolt, and tightly securing the plates 15 to each other.

As the hydraulic intensifier piston 68 moves to the top of its stroke, the head of stem 85 releases the spool 84 of the mechanical timing valve 71, allowing piston 68 to act against the lower end of said spool, returning the same to its raised position of FIG. 8. This shifts the timing valve 72 to re-time the ports thereof, thereby putting air pressure on the surface 66a of the intensifier piston 68 and starting the downward or return cycle. The downward movement of piston 67 unseats ball check 73 and draws hydraulic fluid into chamber 64 for use on the upward stroke. Each time the valve 71 shifts and re-shifts, the intensifier piston 68 reciprocates as necessary, or as long as the trigger is depressed, to complete the installation of the lockbolt fastener.

OPERATION: Return to Rest Position.

When the trigger is released and the spool 78 of the trigger valve 70 moves to its raised position, as in FIG. 7, by the pressure of air in the inlet 24, the ports of said valve become aligned to exhaust air in line 102 and, therefore, simultaneously from the lower portion of cylinder 97 of the hydraulic drain valve 74, mechanical timing valve 71, pressure-reversing valve 72, the reservoir air piston chamber 61, and air intensifier chamber 69.

Upon such release of air pressure, the spring 42 of the gun forces the large piston 40 to its retracted position, thereby forcing the hydraulic fluid past the check valve 99, into line 106, and back into reservoir 61. Also, the spring 38a in front of the predetermined clamping force piston 36 forces the latter to its retracted position and draws hydraulic fluid into cylinder 31 from reservoir 61 through line 52; this in turn makes room for inserting a new collar 13 into the gun and a new cycle of operation is ready to be started.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. The method of setting a lockbolt to firmly lock together two or more plates forming a workpiece, consisting of the steps or:
    inserting a lockbolt into aligned holes in the workpiece with a head on one end of the shank of the lockbolt against one side of said workpiece, a grooved gripping portion on the other end of the shank extending from the other side of the workpiece, and a severable pintail extending from said gripping portion,
    placing a malleable collar having an outer annular enlargement over said gripping portion of the shank and against the workpiece in opposed relation to the shank head,
    swaging the collar to compress the enlargement thereof radially to cause the material of the collar around the bore thereof to enter the grooves of the gripping portion and become firmly locked onto the lockbolt,
    severing the pintail from the lockbolt by axially pulling thereon until the pintail parts from the gripping end of the lockbolt,
    the collar being positioned on the gripping end portion of the shank and the pintail being gripped by hydraulic force that is applied from a pre-set stop during severing of the pintail, and
    sequential swaging of the collar and severing of the pintail being effected by a predetermined pneumatically intensified hydraulic force.

2. The method as defined in claim 1 in which
    upon completion of swaging of the collar, the severing of the pintail is effected, and
    a pre-set stop on the hydraulic force during severing of the pintail effects a corresponding residual clamping force effective between the lockbolt head and the swaged collar.

3. The method as defined in claim 1 in which the hydraulic swaging force and the hydraulic severing force are applied in opposite directions.

4. The method as defined in claim 1 in which the pneumatically intensified hydraulic force is applied to create a reactive force under low hydraulic load producing the mentioned predetermined clamping force applied to the pintail.

5. The method as defined in claim 4 in which the pneumatically intensified hydraulic force is intermittently applied to subject the pintail to successive severing pulls, as necessary, until the same has been completely severed.

6. The method as defined in claim 5 in which the intensifying air, when vented, releases the hydraulic clamping force on the pintail to free the severed portion of said pintail for disposal.

* * * * *